(12) United States Patent
Bush et al.

(10) Patent No.: US 7,715,930 B2
(45) Date of Patent: May 11, 2010

(54) AGGREGATING AUDIT INFORMATION WITH FIELD CONDITIONS

(75) Inventors: Michael A. Bush, Hudson, OH (US); Ardaman Singh Grewal, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 136 days.

(21) Appl. No.: 11/535,563

(22) Filed: Sep. 27, 2006

(65) Prior Publication Data

US 2008/0126377 A1 May 29, 2008

(51) Int. Cl.
*G05B 11/01* (2006.01)
*G05B 9/02* (2006.01)

(52) U.S. Cl. .......................................... 700/26; 700/79
(58) Field of Classification Search .................. 702/183, 702/185, 187; 700/26, 79
See application file for complete search history.

(56) References Cited

U.S. PATENT DOCUMENTS

| | | | |
|---|---|---|---|
| 4,672,039 A | | 6/1987 | Lundblom |
| 5,414,812 A | | 5/1995 | Filip et al. |
| 5,446,903 A | * | 8/1995 | Abraham et al. ............ 710/240 |
| 5,455,775 A | | 10/1995 | Huber et al. |
| 5,638,071 A | | 6/1997 | Capofreddi et al. |
| 5,917,433 A | | 6/1999 | Keillor et al. |
| 6,005,571 A | | 12/1999 | Pachauri |
| 6,256,768 B1 | | 7/2001 | Igusa |
| 6,366,916 B1 | | 4/2002 | Baer et al. |
| 6,421,571 B1 | | 7/2002 | Spriggs et al. |
| 6,430,536 B2 | | 8/2002 | Irving et al. |
| 6,574,779 B2 | | 6/2003 | Allen et al. |
| 6,581,045 B1 | | 6/2003 | Watson |
| 6,631,552 B2 | | 10/2003 | Yamaguchi |
| 6,650,346 B1 | | 11/2003 | Jaeger et al. |
| 6,691,115 B2 | | 2/2004 | Mosher, Jr. et al. |
| 6,735,752 B2 | | 5/2004 | Manoo |
| 6,738,958 B2 | | 5/2004 | Manoo |
| 6,763,377 B1 | | 7/2004 | Belknep et al. |
| 6,775,576 B2 | | 8/2004 | Spriggs et al. |
| 6,782,399 B2 | | 8/2004 | Mosher, Jr. |
| 6,789,214 B1 | | 9/2004 | De Bonis-Hamelin et al. |
| 6,806,813 B1 | | 10/2004 | Cheng et al. |
| 6,847,982 B2 | | 1/2005 | Parker et al. |
| 6,889,096 B2 | | 5/2005 | Spriggs et al. |
| 6,989,751 B2 | | 1/2006 | Richards |
| D522,523 S | | 6/2006 | Parta |
| 7,058,154 B1 | | 6/2006 | Stark et al. |
| 7,062,455 B1 | | 6/2006 | Tobey |
| 7,069,558 B1 | | 6/2006 | Stone et al. |
| 7,102,493 B1 | | 9/2006 | Coppinger et al. |
| 7,110,110 B2 | | 9/2006 | Fink |
| 7,116,228 B1 | | 10/2006 | Singleton |
| 7,117,443 B1 | | 10/2006 | Zilka et al. |
| 7,254,747 B2 | * | 8/2007 | Osborn et al. .................. 714/37 |

(Continued)

*Primary Examiner*—Ryan A Jarrett
(74) *Attorney, Agent, or Firm*—Turocy & Watson LLP; William R. Walbrun; John M. Miller

(57) ABSTRACT

The subject invention relates to a system and/or method that facilitates assessing unexpected field conditions based upon the verification of an audit log. A sensing component can monitor field conditions with respect to an industrial environment. An analysis component can analyze the field conditions and determine that an unexpected event has occurred and retrieve audit logs from a data repository to determine cause of the unexpected event.

31 Claims, 11 Drawing Sheets

U.S. PATENT DOCUMENTS

| | | |
|---|---|---|
| 2002/0116308 A1 | 8/2002 | Cunningham |
| 2003/0028544 A1 | 2/2003 | Virag et al. |
| 2003/0144930 A1 | 7/2003 | Kulkarni et al. |
| 2003/0154199 A1 | 8/2003 | Thomas et al. |
| 2003/0154396 A1* | 8/2003 | Godwin et al. ............. 713/201 |
| 2003/0195764 A1 | 10/2003 | Baker et al. |
| 2003/0225650 A1 | 12/2003 | Wilson et al. |
| 2003/0233438 A1 | 12/2003 | Hutchinson et al. |
| 2004/0015367 A1 | 1/2004 | Nicastro et al. |
| 2004/0024660 A1 | 2/2004 | Ganesh et al. |
| 2004/0111335 A1 | 6/2004 | Black et al. |
| 2004/0205398 A1* | 10/2004 | Osborn et al. ................ 714/25 |
| 2004/0215544 A1 | 10/2004 | Formal et al. |
| 2005/0120288 A1 | 6/2005 | Boehme et al. |
| 2005/0242181 A1 | 11/2005 | Cunningham et al. |
| 2005/0258956 A1 | 11/2005 | Neuwirth |
| 2005/0283718 A1 | 12/2005 | Wilson et al. |
| 2006/0085242 A1 | 4/2006 | Mark et al. |
| 2006/0161593 A1 | 7/2006 | Mori et al. |

* cited by examiner

AGGREGATING AUDIT INFORMATION WITH FIELD CONDITIONS

TECHNICAL FIELD

The claimed subject matter relates generally to monitoring field conditions in a facility and, more particularly, to verify audit logs based upon a detected unexpected field condition.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases or web services referencing databases that are accessible by system/process/project managers on a factory floor. For instance, sensors and associated software can detect a number of instances that a particular machine has completed an operation given a defined amount of time. Additionally, data from sensors can be delivered to a processing unit related to system alarms. Thus, a factory automation system can review collected data and automatically and/or semi-automatically schedule maintenance of a device, replacement of a device, and other various procedures that relate to automating a process.

Control of a process is typically effectuated through controlling one or more assets within a facility, wherein assets can include hardware, such as programmable logic controllers, machines, switches, and the like as well as software components, such as certain programs, sub-programs, and the like. The assets themselves are typically associated with an asset management program and/or functionality, which is conventionally associated with tasks such as backing up devices, checking auditing capabilities, archiving data, periodic scanning of assets to ensure that they are operating without problems, monitoring data entering and leaving a plant floor, and the like.

Security associated with controlling the vast amount of processes related to assets within a facility is a growing concern based at least in part upon the increased exposure of hackers, viruses, and the like. In particular, rogue editors and/or rogue hackers can expose facilities that control processes by changing and/or implementing unauthorized manipulations to the control process and/or assets associated therewith. Conventionally, there are no secure techniques and/or mechanisms to ensure protection from such rogue attacks on a facility and/or process control.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems and/or methods that facilitate assessing unexpected field conditions based upon the verification of an audit log. A sensing component can ascertain a field condition associated with an industrial environment. Such field conditions can be utilized by an analysis component to verify an audit log that stores and/or tracks various changes, edits, manipulations and the like to devices, entities, processes, assets, etc. within the industrial environment. By verifying the audit logs based upon the various detected field conditions, unexpected events, irregularities, and/or normal operation factors can be evaluated to determine the cause of such industrial environment states. In particular, the audit log can be updated when an asset within the industrial environment is edited, updated, changed, etc. in order to log the various data related thereto. The asset can be a physical device, such as a programmable logic controller, a pump, a press, a valve, a drain, a heater, a cooler, a switch, a sensor, a conveyor, and/or a portion thereof, as well as software, firmware, etc. The industrial environment can include various assets that can be verified and/or quality ensured, wherein at least two assets can be hierarchically arranged, such as one that is utilized to manufacture consumables, textiles, automobiles, or any other suitable industrial environment.

In another aspect in accordance with the subject innovation, the subject innovation can include a data repository that can retain at least one of the audit log and the hierarchical representation of assets. The data repository can be a single data repository and/or can be a distributed data store. The hierarchy can be based at least in part upon the physical location of devices (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy.

In accordance with another aspect of the innovation described herein, the verification component can utilize a detection component that can detect any alterations associated with assets within the industrial environment. In particular, the detection component can poll the assets to ascertain if any assets have been altered, changed, edited, updated, and/or any combination thereof. Moreover, the subject innovation can further include an updating component that can update at least one of following: the hierarchical representation of assets in accordance with any alterations detected by the detection component; and the audit log in accordance with any alterations detected by the detection component.

In accordance with another aspect of the claimed subject matter, the subject innovation can further include an alert component that can provide various alerts in relation to validation of assets, invalidation of assets, field conditions, rogue attacks, rogue editors, assets within the industrial environment, the hierarchical representation of assets, and/or any combination thereof. The alert component can provide audio, visual, device/process manipulation, text, digital signal, communication, etc. alerts that indicate status to a user and/or entity (e.g., computer, device, etc.). In other aspects of the claimed subject matter, methods are provided that facilitates determining the cause of unexpected field conditions within an industrial environment by validating audit logs.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
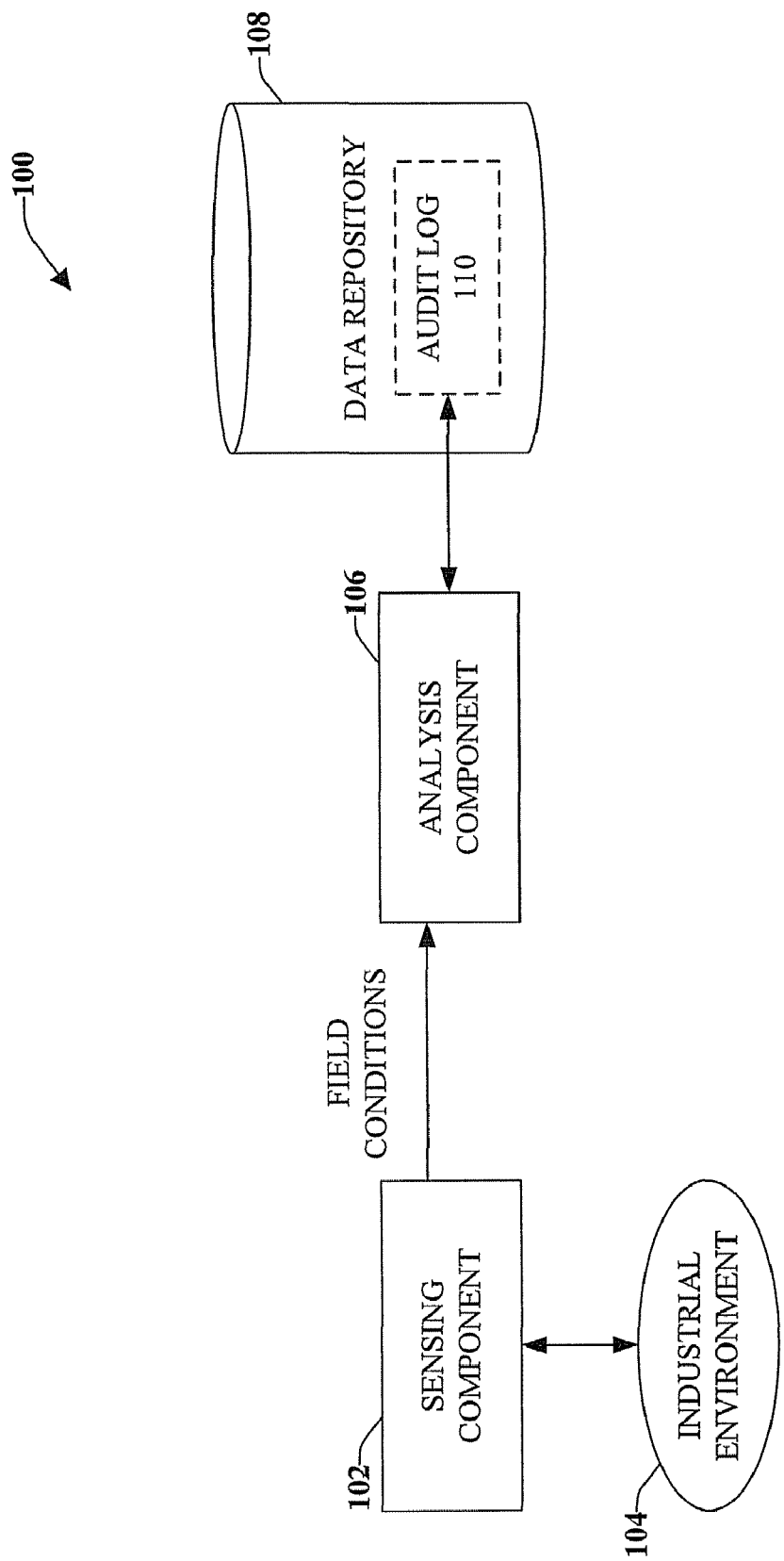
FIG. 1 illustrates a block diagram of an exemplary system that facilitates assessing unexpected field conditions based upon the verification of an audit log.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a system 100 that assesses unexpected field conditions based upon the verification of an audit log. The system 100 can include a sensing component 102 that can monitor and/or determine at least one field condition of an industrial environment 104. Based at least in part upon the field condition ascertained by the sensing component 102, an audit log 110 can be examined to determine the cause of an unexpected event within the industrial environment 104. In other words, the sensing component 102 can monitor the industrial environment 104 and related field conditions, while the analysis component 106 can determine that an unexpected event has occurred and evaluate the audit log 110 to provide possible causes of the unexpected event. In particular, the audit log 110 can be stored within a data repository 108. The audit log 110 can be a log that tracks various data associated with, but not limited to, changes, edits, manipulations, and the like to processes, assets, devices, controllers, etc. within the industrial environment 104. It is to be appreciated that a plurality of audit logs 110 can be utilized with the industrial environment 104. The system 100 can leverage audit data from the audit log 110 within the data repository 108 with data from a real-time environment such as the industrial environment 104. Moreover, the audit log 110 can track data that is authenticated by a security measure, wherein the security measure can be, but is not limited to, a username, a password, an administrator, a biometric data, a fingerprint, a designated Internet Protocol (IP) address, etc. When, for instance, an error or any other suitable defect associated with the industrial environment 104 is determined by the sensing component 102, the analysis component 106 can examine the audit log 110 to evaluate the possible causes of the error and/or defect.

In one example, while monitoring the industrial environment 104, a particular defect and/or problem can be detected in real-time. The analysis component 106 can examine the audit log 110 to assist in determining the cause of the problem and/or defect. Specifically, a control application can be enabled and edited, wherein such data can be stored and/or provided to the audit log 110. Thus, the audit log 110 can include any and/or all changes associated with the industrial environment 104. Therefore, the analysis component 106 can ascertain whether or not the problem/defect is related to a valid and authorized change or a possible rogue attack and/or rogue editor. Assuming that the changes were authorized, data can be collected to track such changes and respective errors for future changes. In the event that the changes were not authorized, notification can be provided such as, but not limited to, an alarm can be generated indicating a possible rogue attack and/or rogue editor may be present.

In accordance with one aspect of the claimed subject matter, the audit log 110 can be compared with data images in order to verify the content associated therewith. Based upon such comparison, alerts and/or various notifications can be initiated. For instance, an alarm can be generated to notify of a detected inconsistency. In another example, a disparate alarm can be employed to notify that no errors and/or inconsistencies exist. Moreover, the system 100 can employ rollback techniques that allow the industrial environment 104 to be rolled back to a particular point in the application process before the detected inconsistencies were known.

Figure 2:
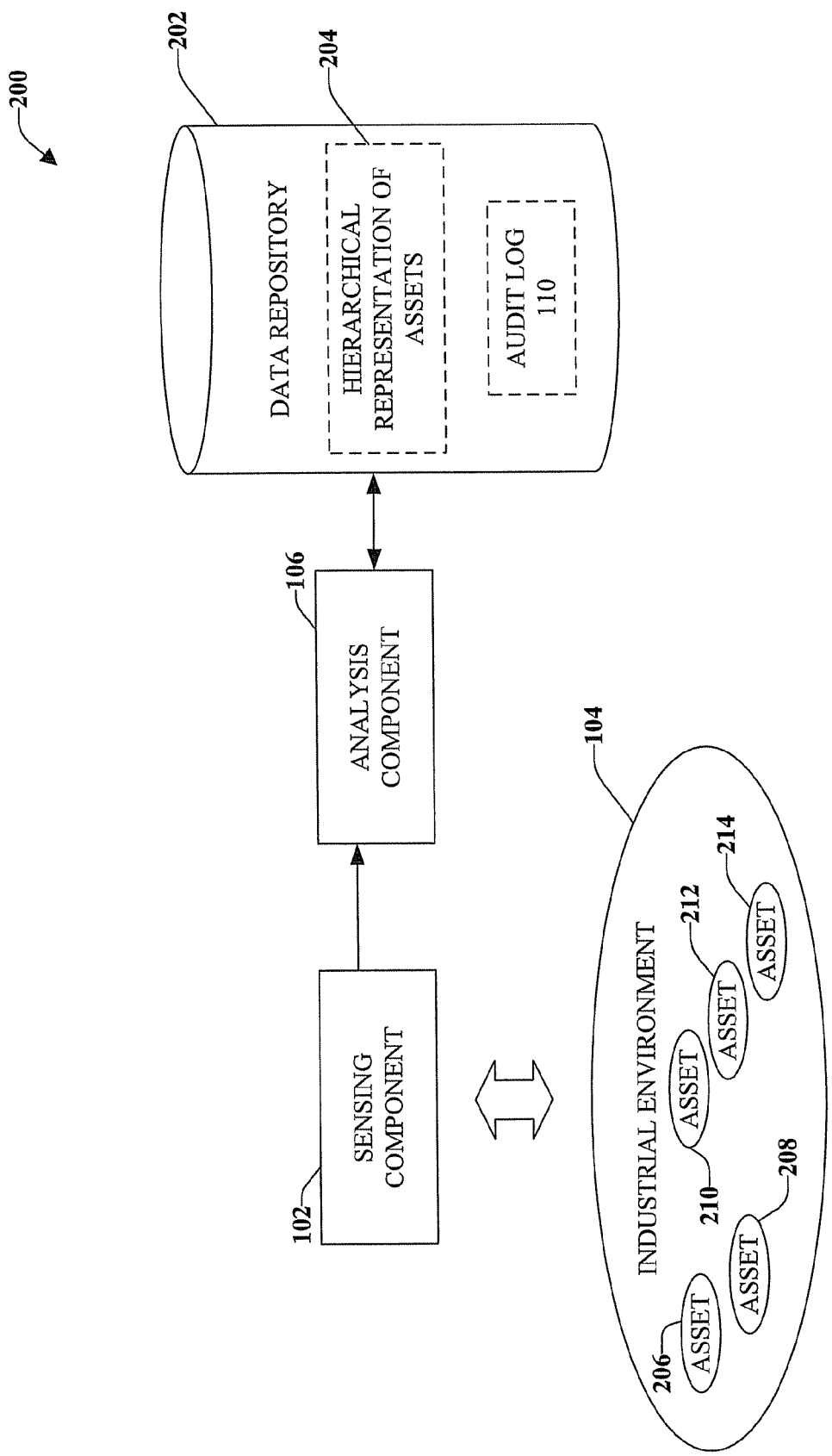
FIG. 2 illustrates a block diagram of an exemplary system that facilitates determining the cause of unexpected field conditions within an industrial environment by validating audit logs.

FIG. 2 illustrates a system 200 that facilitates determining the cause of unexpected field conditions within an industrial environment by validating audit logs. The system 200 can employ the verification of audit log 110 to allow the evaluation of various field conditions associated with the industrial environment 104. In particular, the sensing component 102 can monitor field conditions associated with the industrial environment 104 and the analysis component 106 can examine various audit logs 110 to assist in determining factors associated with the particular field condition. Thus, the system 200 can determine the causes and/or factors associated with particular field conditions within the industrial environment 104 by examining the various audit logs 110 that include tracking data related to various devices, entities, assets, and the like.

The system 200 can further include a data repository 202 that can retain a hierarchical representation of assets 204 and the audit log 110. It is to be appreciated that the audit log 110 can include data related to changes, manipulations, edits, and the like to various assets within the industrial environment 104. The data repository 202 can be a single data repository and/or can be a distributed data store. The hierarchy can be based at least in part upon the physical location of devices (e.g., a region of a factory can have several defined sub-regions, which in turn can comprise sub-regions), standards associated with industry, such as ISA S95, ISA S88, and the like, proprietary hierarchy that is provided by an enterprise, or any other suitable hierarchy. For instance, a top portion of the hierarchy may be a plant, and a sub-level of the plant may be programmable logic controllers utilized within the plant, and a sub-level of the programmable logic controllers can be devices controlled by such controllers. It is understood that this is but one example of a hierarchy, and is for illustrative purposes only. Thus, the verification of assets can be the validation and/or verification of assets 206-214 within the industrial environment 104, the hierarchical representation of assets 204, and/or any combination thereof.

The industrial environment 104 can include various assets 206-214 that can be verified and/or quality ensured by utilizing the audit log 110, wherein at least two assets can be hierarchically arranged, such as one that is utilized to manufacture consumables, textiles, automobiles, or any other suitable industrial environment. To illustrate another example hierarchy, the asset may be a programmable logic controller, while the assets 212 and 214 may be different control programs effectuated by the asset. Thus, the hierarchical representation of assets may be a combination of physical devices and software. For instance, an asset can be a physical device, such as a programmable logic controller, a pump, a press, a valve, a drain, a heater, a cooler, a switch, a sensor, a conveyor, and/or a portion thereof, as well as software, firmware, etc.

Figure 3:
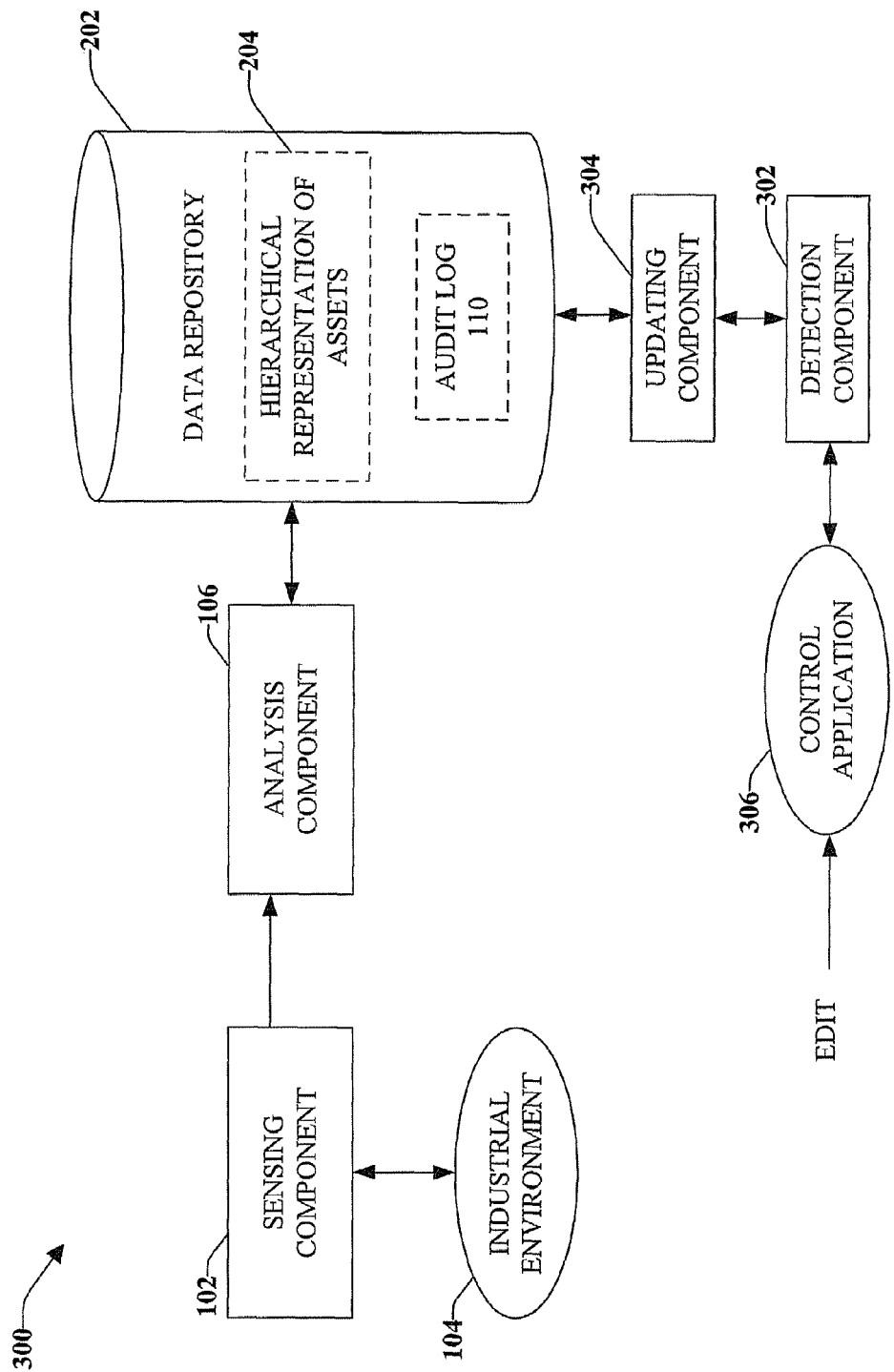
FIG. 3 illustrates a block diagram of an exemplary system that facilitates preventing rogue attacks within an industrial environment by ensuring the purity of an audit log.

FIG. 3 illustrates a system 300 that facilitates preventing rogue attacks within an industrial environment by ensuring the purity of an audit log. The system 300 can include a detection component 302 that can be communicatively coupled to a control application 306. For example, the control application 306 can be communicatively coupled by way of an intranet or other suitable network. The detection component 302 can ascertain when the control application 306 and/or any other suitable asset associated with the industrial environment 104 has been edited, changed, updated, manipulated, added, deleted, etc. Any changes and/or edits associated with the control application 306 can be communicated to the audit log 110 to allow for real-time and up-to-date additions, removals, updates, changes, and the like to ensure quality validation techniques and/or mechanisms for the audit log 110 associated with the industrial environment 104, respective assets, the hierarchical representation of assets 204, and/or any combination thereof. Pursuant to an example, the detection component 302 can poll a network to determine whether any alterations have been made with respect to assets and/or the control application 306 resident upon the network. In another example, an asset may have sufficient intelligence to initiate a message to the detection component 302, wherein such message can include a type or identity of the asset and/or control application 306, location upon a network of the asset and/or control application 306, associated assets and/or disparate control applications 306, etc. Still further, an asset and/or control application 306 can indicate to the detection component 302 a type of change, edit, and/or manipulation associated with the asset.

Once an alteration/edit occurs with respect to one or more control application 306 related to the industrial environment 104 and such alteration/edit has been detected by the detection component 302, an updating component 304 can update the hierarchical representation of assets 204 and/or the audit log 110 within the data repository 202. For instance, if the control application 306 is edited, the updating component 304 can update the audit log 110 and/or the hierarchical representation of assets 204, and the like based upon detections made by the detection component 302. The updating component 304 can also review the structure of the hierarchical representation of assets 204 and/or the audit log 110 to ensure validity. Once this review has been undertaken, the updating component 304 can intelligently and automatically update the hierarchical representation of assets 204 and/or the audit log 110. For instance, if an asset is added to the industrial environment 104, the updating component 304 can add the asset in an appropriate position within the hierarchical representation of assets 204 and/or the audit log 110 indicating such additional asset.

A graphical user interface component (not shown) can utilize various graphics and/or alerts to indicate changes/edits associated with assets within the industrial environment 104 and/or control applications 306. In particular, upon the edit and/or manipulation of an asset and/or the control application 306, the graphical user interface component can indicate such detection with, for example, an alert, an audible alert, a graphical icon, a graphic, a textual document, an email, a text, etc. Moreover, any edits and/or manipulations associated with the hierarchical representation of assets 204 can be indicated via the graphical user interface component utilizing, for instance, an alert, an audible alert, a graphical icon, a graphic, a textual document, an email, a text, etc.

In addition, the system 300 can contain an instance of an asset that does not include sufficient intelligence to inform the updating component 304 or identify when such asset is coupled to a network. It may be known, however, how particular assets react to certain stimulation. Accordingly, when the asset is added to a network, a stimulating component (not shown) can provide the asset and/or the control application 306 with certain electrical stimuli. The asset can be associated with, for example, a fingerprint and/or any other suitable identification data (e.g., radio frequency identification, bar code, serial number, etc.) that can be utilized to identify the asset, wherein the identification data makes itself known when provided with particular stimuli. Pursuant to one example, the stimulating component can be an electrical power source which provides certain electrical pulses to the asset to determine the identification data. For instance, the asset can react in a certain manner to particular stimuli, thus illuminating the identification data to be recognized by, for instance, a recognition component (not shown).

The recognition component can be trained to monitor responses of the asset and/or control applications 306 with respect to certain stimuli provided by the stimulating component. Thus, the recognition component can determine an identity of the asset (and possibly relationships to other assets, control applications, and the like) by discerning the identification data associated with such asset. The updating component can thereafter utilize this information as well as other available information to update the hierarchical representation of assets 204. Thus, a representation of the asset can be placed appropriately within the hierarchical representation of assets 204 by the updating component.

Figure 4:
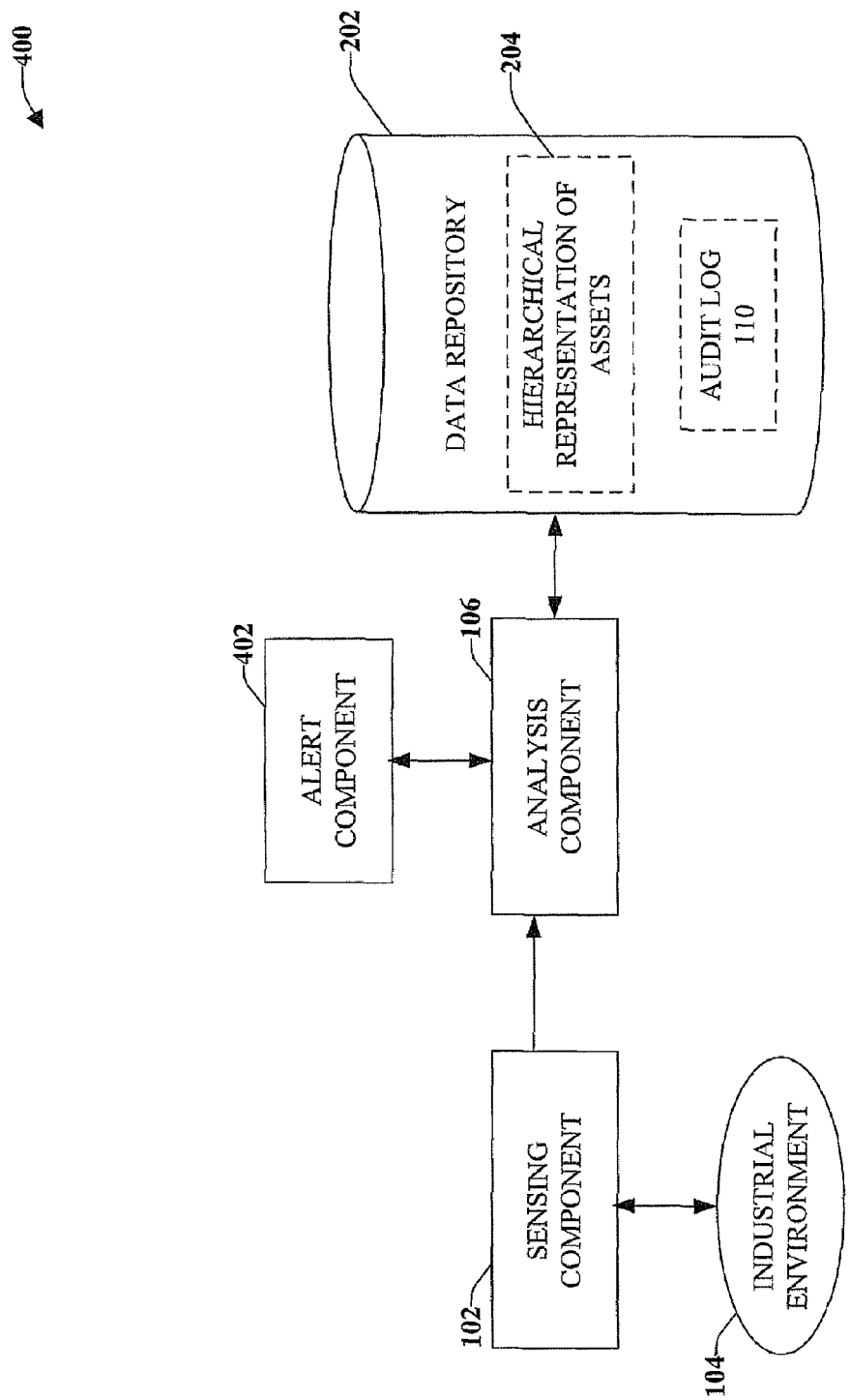
FIG. 4 illustrates a block diagram of an exemplary system that facilitates alerting the presence of a rogue attack within an industrial environment based upon the validity of audit logs.

FIG. 4 illustrates a system 400 that facilitates alerting the presence of a rogue attack within an industrial environment based upon the validity of audit logs. The system 400 can further include an alert component 402 that can provide various alerts in relation to verification of the assets within the industrial environment 104, audit logs 110, control applications, the hierarchical representation of assets 204, and/or any combination thereof. For instance, an alert can be an indication of verification of the audit log 110, an indication that the audit log is not valid, an indication of a rogue attack, an indication of an edit to an asset, an indication that an edit to an asset has been updated to the audit log 110, etc. The alert component 404 can provide audio, visual, device/process manipulation, text, digital signal, communication, etc. alerts that indicate status of the system 400 to a user and/or entity (e.g., computer, device, etc.). In one particular example, the alert component 404 can sound an audible alarm to inform users when a rogue attack has been detected from the comparison of the audit log 110 and the actual approved edits to assets within the industrial environment 104 (e.g., control applications, software, devices, entities, controllers, etc.).

Figure 5:
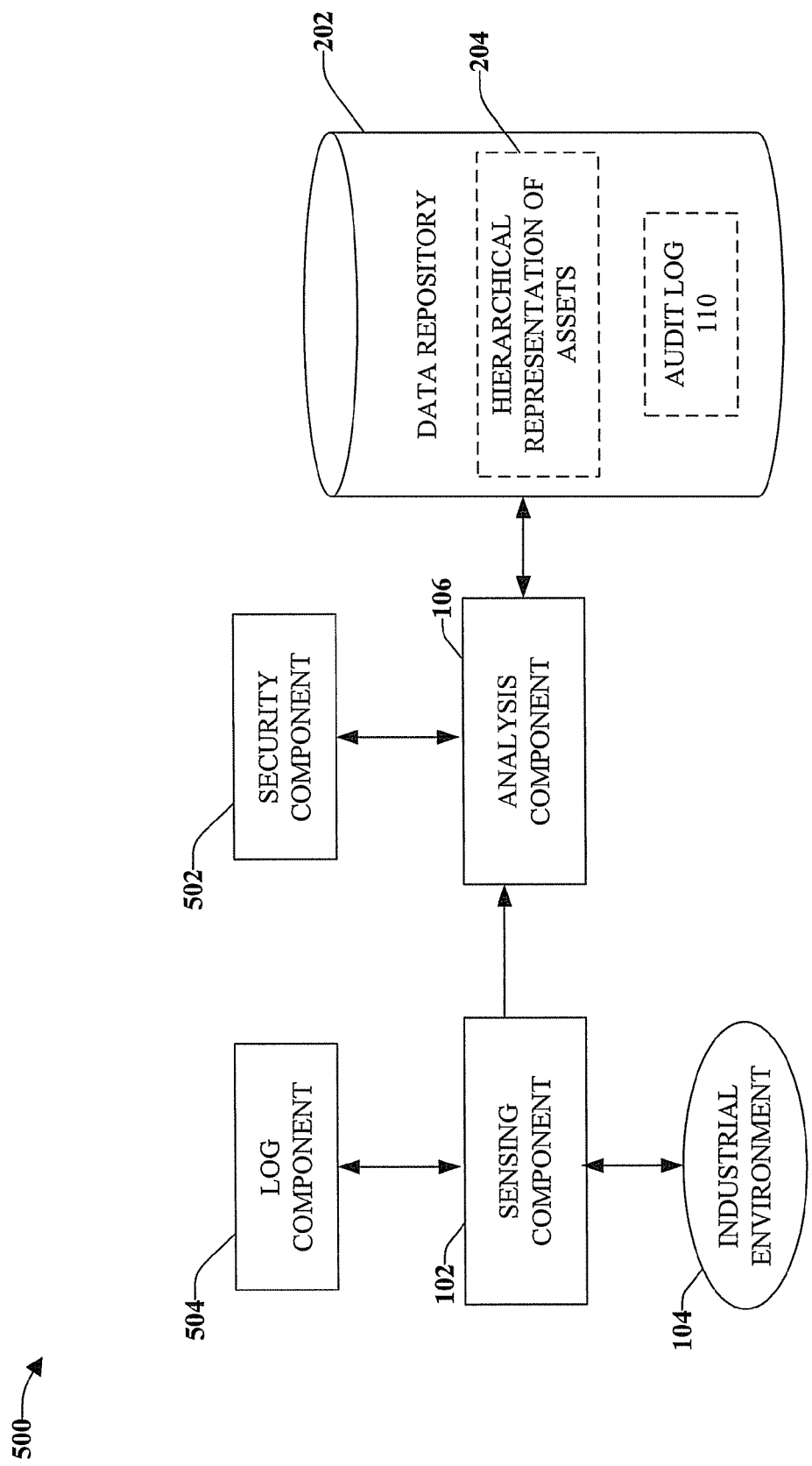
FIG. 5 illustrates a block diagram of an exemplary system that facilitates determining the cause of unexpected field conditions within an industrial environment by validating audit logs.

FIG. 5 illustrates a system 500 that facilitates determining the cause of unexpected field conditions within an industrial environment by validating audit logs. The system 500 can include a security component 502 that can ascertain which audit log 110 a user is authorized to verify and/or edit. In accordance with one example, a user may only be authorized to verify a certain audit log 110, while not authorized to verify a disparate audit log 110. In addition, the user may be able to manipulate a certain audit log 110, while not authorized to verify a disparate audit log 110. The security component 502 can determine identity of a user by analyzing, for instance, usernames, passwords, personal identification numbers, personal status, management positions, occupation hierarchy, and the like. Furthermore, the security component 502 can determine a user's identity by analyzing biometric indicia, such as voice recognition, fingerprint analysis, retina analysis, etc.

Still further, the security component 502 can perform granular security with respect to a user, an asset, and/or an audit log 110. Pursuant to one example, a user's rights with respect to a particular asset can change as time alters. For instance, certain management functionality associated with an asset requested by a user can be accessible by the user during a first shift but not accessible to the user during a second shift. Additionally, the security component 502 can provide different measures of security given different states of an asset, process, audit log 110, and the like. Therefore, for example, a user may have rights with respect to verification when an audit log 110 is in a first state but may have different rights with respect to the same verification when the audit log 110 are in a second state. Once a user has been identified and rights associated with such user have been determined, the user can select verification associated with the audit log related to the industrial environment 104.

The system 500 can further include a log component 504 that can work in conjunction with the sensing component 102, and/or any other suitable component related to the system 500 in order to track any field conditions associated with the industrial environment 104. For instance, the log component 504 can track and/or record data related to the field conditions ascertained, data related to the determined field conditions (e.g., time, description, etc.), classification of a field condition (e.g., expected, unexpected, dangerous, normal, etc.), etc. Moreover, the log component 504 can track various user data in connection with any security and/or authorization utilized with the system 500. For example, a particular user can initiate a manual correction for a detected unexpected error and/or condition in respect to the industrial environment 104. In such a case, the log component 504 can track which particular user initiated the specific alteration and/or edit that caused the particular unexpected error and/or condition.

Figure 6:
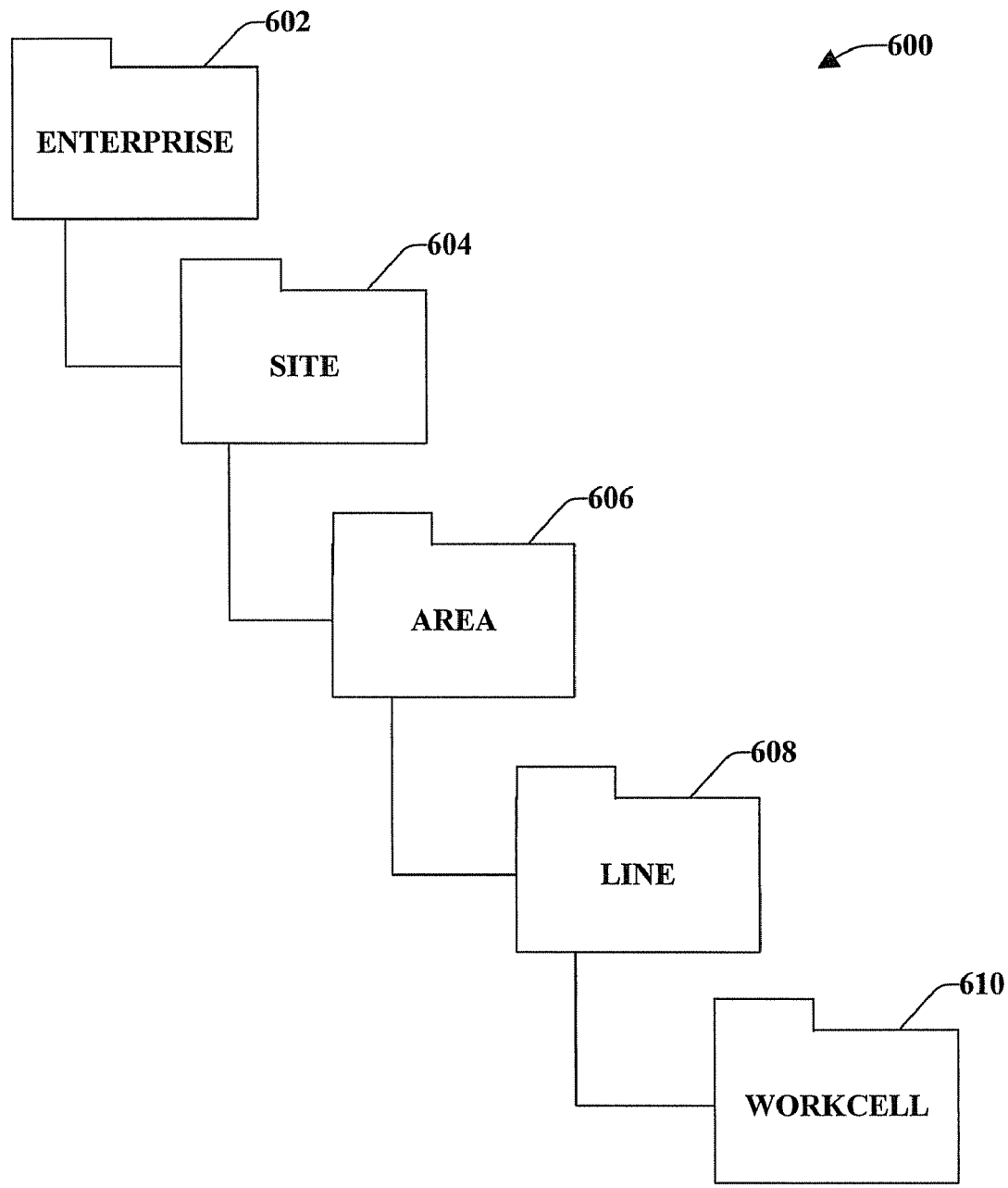
FIG. 6 illustrates a block diagram of an exemplary data structure that represents a hierarchical structure of an industrial automation system.

Referring now to FIG. 6, an exemplary hierarchical structure 600 which can be utilized in connection with the hierarchically structured data model (e.g., hierarchical representation of assets) alluded to herein is illustrated. For example, the data model can facilitate nested structures, thereby mitigating deficiencies associated with data models that employ flat namespaces. The structure 600 includes an enterprise level 602, where a particular enterprise can be represented within data structured in accordance with a hierarchical data model. Beneath the enterprise level 602 can be a site level 604, so that a particular factory (site) within an enterprise can be represented within a data packet. Beneath the site level 604 an area level 606 can exist, which specifies an area within the factory that relates to the data. A line level 608 can lie beneath the area level 606, wherein the line level 608 is indicative of a line associated with particular data. Beneath the line level 608 a workcell level 610 can exist, thereby indicating a workcell associated with the data. Utilizing a nested, hierarchical data model, PLCs can become more aware of data associated therewith. Furthermore, the hierarchy 600 can be customized by an owner of such hierarchy. For instance, more granular objects/levels can be defined within the hierarchy 600 in relation to the various assets associated therewith.

Figure 7:
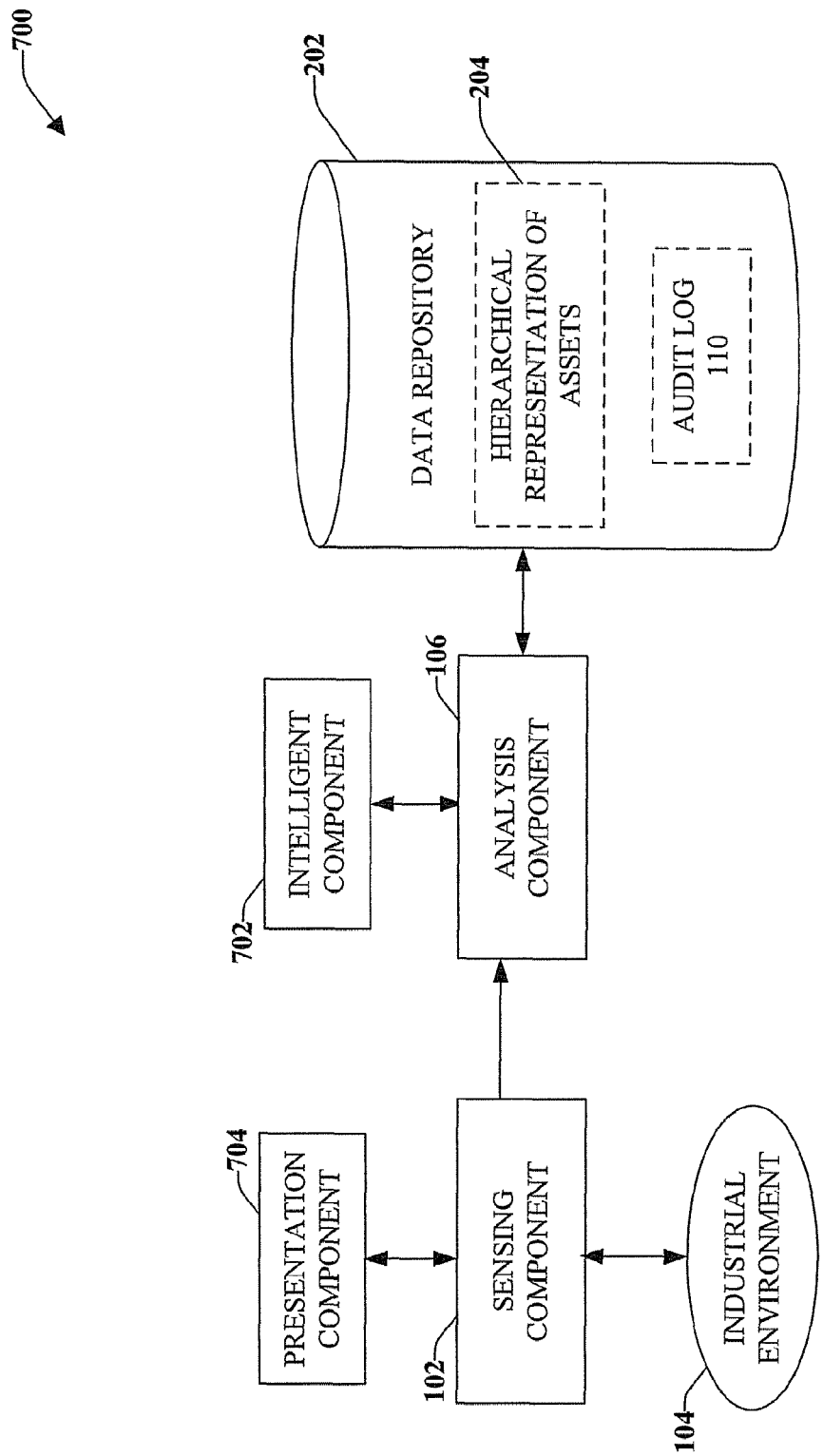
FIG. 7 illustrates a block diagram of an exemplary system that facilitates assessing unexpected field conditions based upon the verification of an audit log.

FIG. 7 illustrates a system 700 that employs intelligence to facilitate assessing unexpected field conditions based upon the verification of an audit log. The system 700 can include the sensing component 102, an industrial environment 104 with assets, and the analysis component 106 that can all be substantially similar to respective components, environments, and assets described in previous figures. The system 700 further includes an intelligent component 702. The intelligent component 702 can be utilized by the sensing component 102 and/or the analysis component 106 to facilitate analyzing field conditions within the industrial environment to ascertain the cause of particular field conditions. For example, the intelligent component 702 can infer audit log edits, asset edits, control application edits, field conditions, corrective measures to detected unexpected events, alarms, rogue attacks, validation techniques associated with audit logs 110, corrective measures for invalid assets, changes in assets, assets added, assets removed, asset locations, security settings, updates, detection of changes/edits with an asset, asset identification data, hierarchical representation of assets within the industrial environment, user settings, profiles, etc.

It is to be understood that the intelligent component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The presentation component 704 can provide various types of user interfaces to facilitate interaction between a user and any component coupled to the analysis component 106. As depicted, the presentation component 704 is a separate entity that can be utilized with analysis component 106. However, it is to be appreciated that the presentation component 704 and/or similar view components can be incorporated into the analysis component 106 and/or a stand-alone unit. The presentation component 704 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the analysis component 106.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
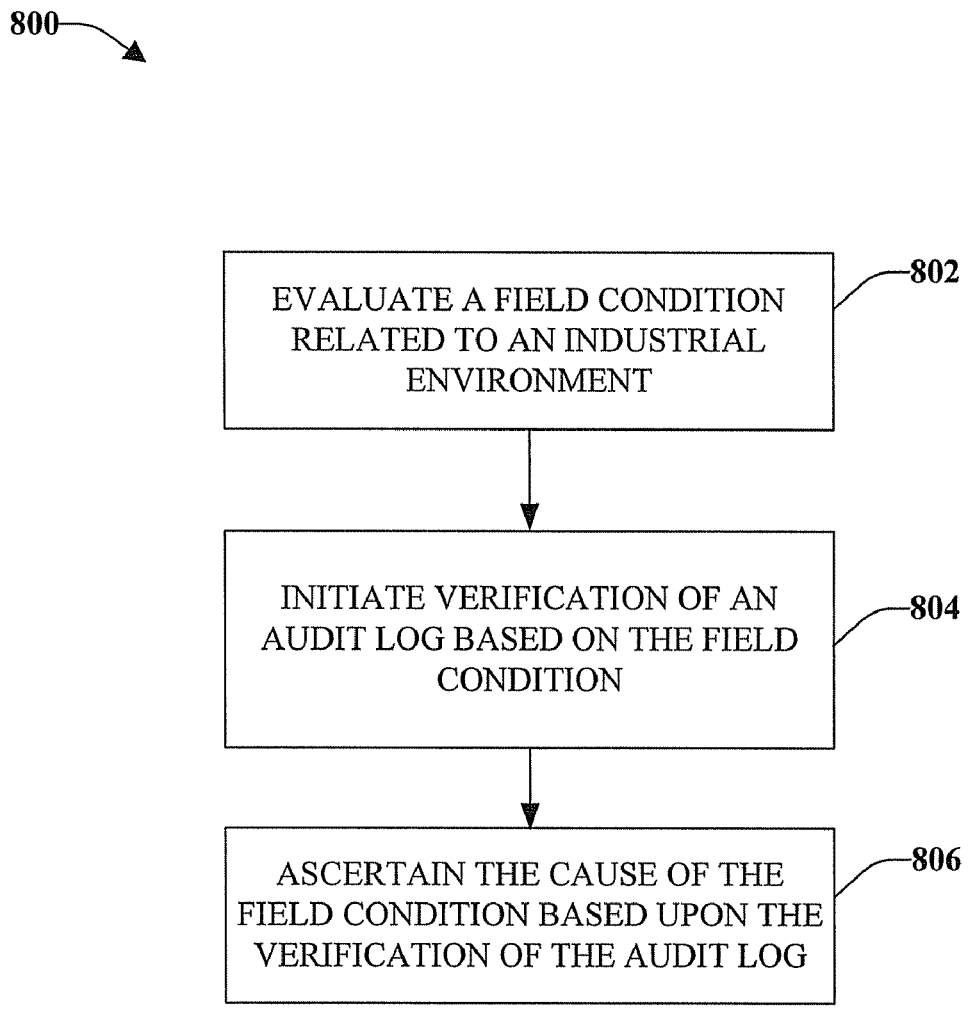
FIG. 8 illustrates an exemplary methodology for preventing rogue attacks within an industrial environment by ensuring the purity of an audit log.
Figure 9:
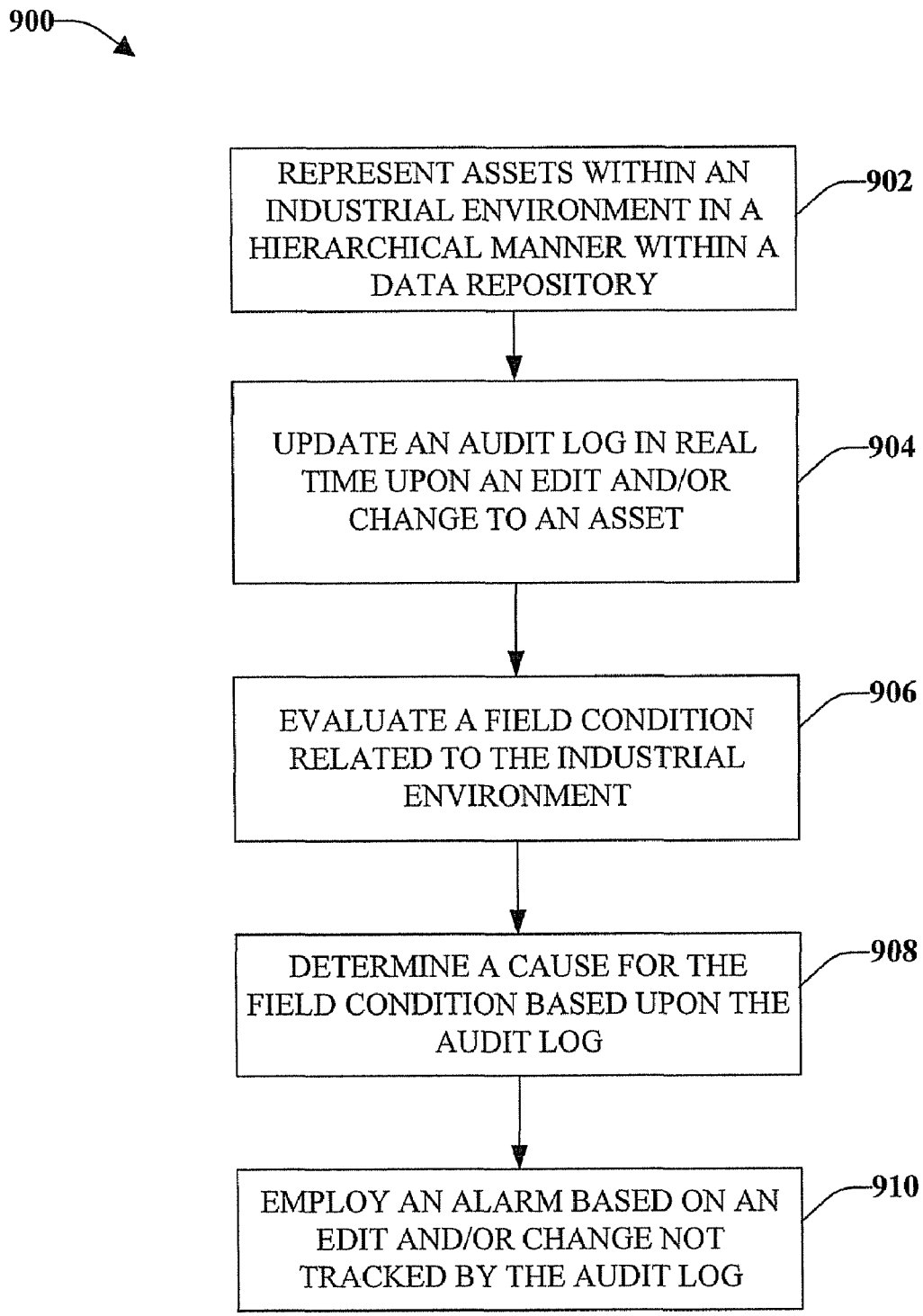
FIG. 9 illustrates an exemplary methodology that facilitates determining the cause of unexpected field conditions within an industrial environment by validating audit logs.

Referring to FIGS. 8-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 for preventing rogue attacks within an industrial environment by ensuring the purity of an audit log. At reference numeral 802, a field condition related to an industrial environment can be evaluated. The field condition can be any condition associated with a process, application, software, device, asset, entity, and the like within the industrial environment. For example, the field condition can be the execution of a particular software application, wherein various field conditions associated therewith can be evaluated.

At reference numeral 804, an audit log can be verified based at least in part upon the evaluated field condition. In other words, if the evaluation of the field condition alludes to an unwanted and/or irregular characteristic and/or condition, validation of the audit log can be initiated. The audit log can track various changes, edits, manipulations, updates, etc. for the various processes, applications, software, devices, assets, entities, and the like within the industrial environment. Thus, if a user changes and/or edits a control application and an irregular characteristic related to a field condition is detected, then the audit logs can be verified and/or validated. At reference numeral 806, the cause of the particular field condition can be ascertained based at least in part upon the verification of the audit log. By verifying the audit log, changes and/or edits can be examined to ensure such changes and/or edits where approved, if the edits caused the irregularity, if the edits contributed to the irregularity, if the edits were from a rogue attack, etc.

FIG. 9 illustrates a methodology 900 that determines the cause of unexpected field conditions within an industrial environment by validating audit logs. At reference numeral 902, assets within an industrial environment can be represented in a hierarchical manner based upon a characteristic and stored in a data repository. The data repository that can retain the hierarchical representation of assets and can be a single data repository and/or can be a distributed data store. For instance, an asset can be a physical device, such as a programmable logic controller, a pump, a press, a valve, a drain, a heater, a cooler, a switch, a sensor, a conveyor, and/or a portion thereof, as well as software, firmware, a controller application, etc. The industrial environment can include various assets wherein at least two assets can be hierarchically arranged, such as one that is utilized to manufacture consumables, textiles, automobiles, or any other suitable industrial environment. To illustrate another example hierarchy, the asset may be a programmable logic controller, while the assets may be different control programs effectuated by the asset. Thus, the hierarchical representation of assets may be a combination of physical devices and software.

In addition, the hierarchy can be based at least in part upon a characteristic such as, but not limited to, the physical location of devices (e.g., a region of a factory can have several defined sub-regions, which in turn can comprise sub-regions), standards associated with industry, such as ISA, S95, ISA S88, and the like, proprietary hierarchy that is provided by an enterprise, or any other suitable hierarchy. For instance, a top portion of the hierarchy may be a plant, and a sub-level of the plant may be programmable logic controllers utilized within the plant, and a sub-level of the programmable logic controllers can be devices controlled by such controllers. It is understood that this is but one example of a hierarchy, and is for illustrative purposes only. Moreover, such physical assets and/or hierarchically represented assets can be associated with a process.

At reference numeral 904, an audit log can be updated in real-time based upon an edit and/or a change to an asset. Any alteration, edit, manipulation, update, and the like can be tracked by the audit log, wherein the audit logs can be, for instance, stored within the data repository. Upon any modification to an asset, application, device, process, etc. within the industrial environment, the audit log can be updated to track and/or store any approved change. In one example, a user can edit a control application, wherein the audit log can track the user providing the change, the control application changed, the change to the application, etc.

At reference numeral 906, a field condition related to the industrial environment can be evaluated and/or monitored. The field condition can be any condition associated with a process, application, software, device, asset, entity, and the like within the industrial environment. For example, the field condition can be programmatically defined states of a particular software application, wherein various field conditions associated therewith can be evaluated. At reference numeral 908, a cause for the field condition can be determined based at least in part upon the audit log and data related therewith. In particular, the audit log can be compared in light of the various evaluated field conditions to expose inconsistencies with the tracked edits, changes, manipulations, etc. For instance, a rogue attack can be determined based on the field condition monitored (e.g., an irregularity, an error, an unexpected condition, etc.) and such changes not being recorded by the audit log. In another example, future changes, edits, and the like can be implemented based on historic data associated with field conditions and respective edits and/or changes.

At reference numeral 910, an alarm can be employed in connection with an edit and/or change not tracked by the audit log. For instance, an alert can be an indication of verification of the audit log, an indication that the audit log is not valid, an indication of a rogue attack, an indication of an edit to an asset, an indication that an edit to an asset has been updated to the audit log, etc. The alert can further provide audio, visual, device/process manipulation (e.g., start, stop, safe mode, etc.), text, digital signal, communication, etc. alerts that indicate status to a user and/or entity (e.g., computer, device, etc.). Moreover, it is to be appreciated that various security, logging, alerting, updating, and/or detection techniques can be employed with the subject innovation.

Figure 10:
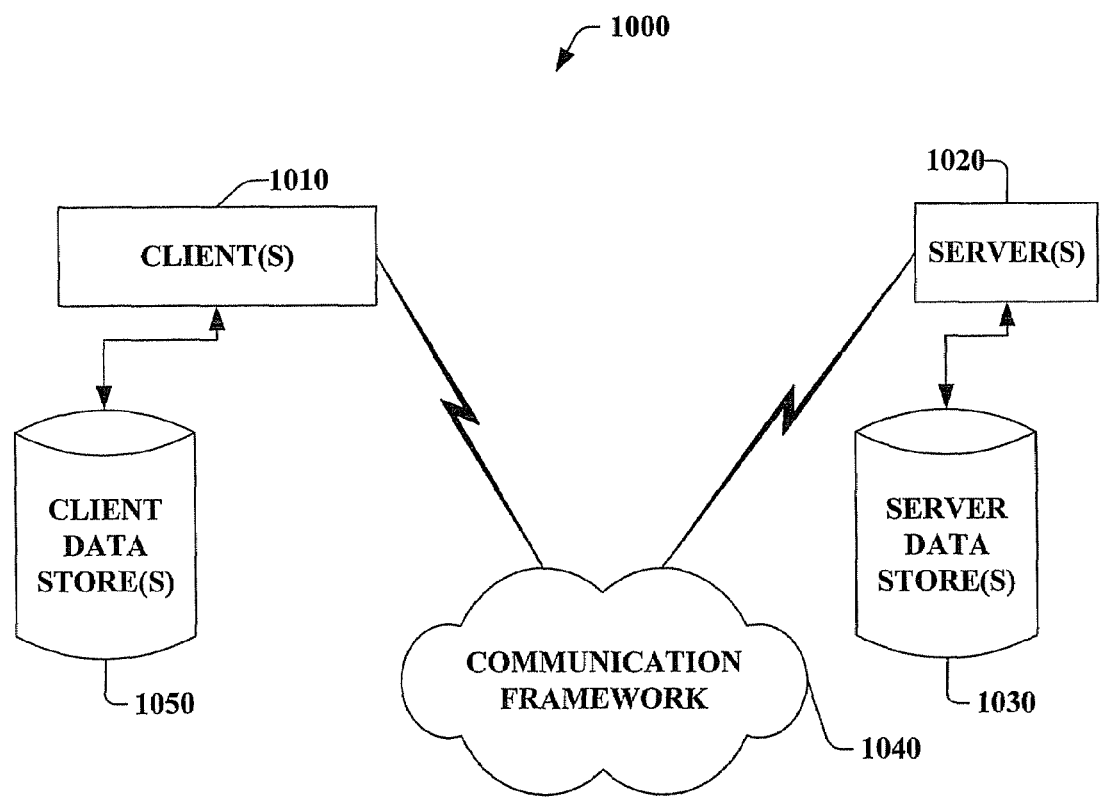
FIG. 10 is an exemplary computing environment that can be utilized in connection with the claimed subject matter.
Figure 11:
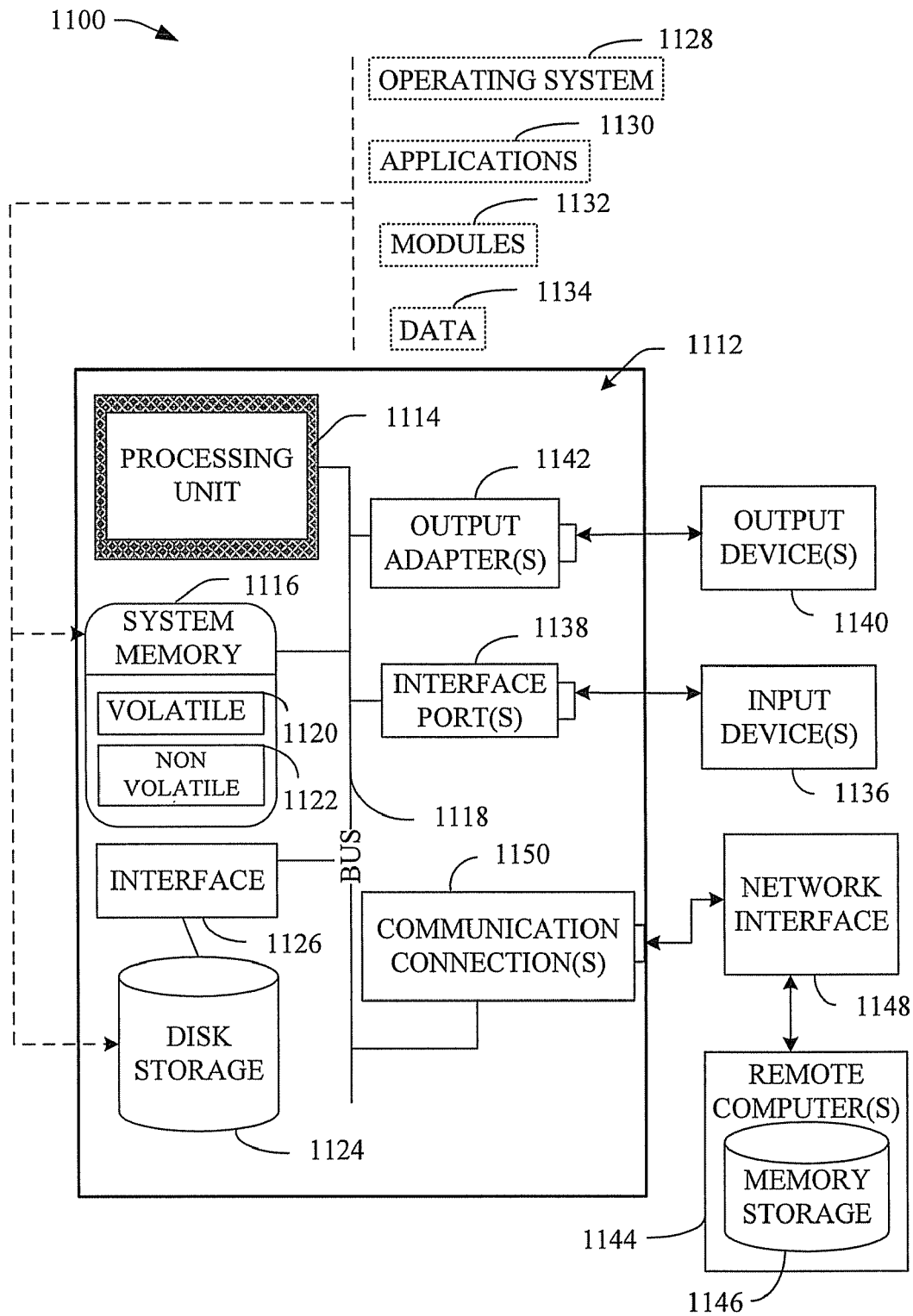
FIG. 11 is an exemplary networking environment that can be utilized in connection with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 101 0. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. An asset management system stored on a storage medium, comprising:
    a sensing component that monitors field conditions with respect to an industrial environment;
    an analysis component that analyzes the field conditions and determines that an unexpected event has occurred and retrieves audit logs that include changes associated with the industrial environment from a data repository and determines a cause of the unexpected event and whether the unexpected event is related to an authorized change or a rogue attack; and
    a security component that identifies a user and the user's rights, and determines authorization to verify or edit at least one of an asset, the audit log, the industrial environment, or a portion of the industrial environment.

2. The system of claim 1, the data repository retains at least one of a hierarchical representation of assets within the industrial environment or the audit log.

3. The system of claim 2, the asset is hierarchically represented based at least in part upon a physical location of the asset within the industrial environment.

4. The system of claim 2, the hierarchical representation of assets is based at least in part upon an industry standard which can be at least one of ISA S95 or ISA S88.

5. The system of claim 2, the hierarchical representation of assets is based at least in part upon a proprietary hierarchy that is provided by an enterprise.

6. The system of claim 2, the asset is at least one of a physical device, a controller application, software, or a firmware.

7. The system of claim 6, the physical device is at least one of a programmable logic controller, a pump, a press, a valve, a drain, a heater, a cooler, a switch, a sensor, or a conveyor.

8. The system of claim 1, the audit log tracks at least one of a change, an edit, a manipulation, and an update related to at least one of a process, an asset, a device, a controller, software, firmware, or a control application within the industrial environment.

9. The system of claim 8, the audit log tracks data that is authenticated by a security measure.

10. The system of claim 9, the security measure is at least one of a username, a password, an administrator, a biometric data, a fingerprint, or a designated Internet Protocol (IP) address.

11. The system of claim 1, further comprising a detection component that ascertains at least one of when an asset has been edited, when an asset has been manipulated, when an asset has been updated, or when an asset has been changed.

12. The system of claim 11, the asset includes sufficient intelligence to initiate a message to the detection component, wherein such message can include at least one of a type of the asset, a type of edit to the asset, a type of change to the asset, an identity of the asset, or a location upon a network of the asset.

13. The system of claim 11, the asset utilizes an identification data to detect and maintain alterations of an asset within the industrial environment.

14. The system of claim 11, further comprising an updating component that updates at least one of the following: 1) the hierarchical representation of assets within the data repository based upon an alteration determined by the detection component; or 2) the audit log based upon an alteration determined by the detection component.

15. The system of claim 1, further comprising an edit to a control application is recorded by the audit log to evaluate the field condition within the industrial environment monitored by the sensing component, wherein the analysis component provides a reason for the particular field condition.

16. The system of claim 1, the analysis component determines whether at least one of a rogue attack or a rogue editor is present within the industrial environment by evaluating at least the audit log.

17. The system of claim 1, further comprising an alert component that can provide an alert for at least one of the following: a detected rogue attack; a detected rogue editor; an edit related to the system; a change related to an asset; an update related to a hierarchical representation of assets; an unexpected field condition; an irregular field condition; a valid audit log; or an expected field condition.

18. The system of claim 17, the alert is at least an audio alert, a visual alert, a manipulation to a process, a text, a digital signal, a communication to a user, or a communication to an entity.

19. The system of claim 1, further comprising a log component to track a result associated with at least one of the sensing component or the analysis component.

20. The system of claim 19, the log component tracks at least one of the following: the field condition; an evaluation of the audit log; the audit log; an edit to an asset; a change to an asset; a manipulation to an asset; or an update to a hierarchical representation of assets.

21. The system of claim 1, further comprising an intelligence component that aids at least the sensing component or the analysis component by inferring states of at least the asset management system, the industrial environment, and a user.

22. A method for assessing unexpected events based upon audit logs, comprising:
    a processor-implemented act of executing computer executable instructions stored on a computer readable storage medium to implement the following:

monitoring field conditions with respect to an industrial environment;

analyzing the field conditions and determines that an unexpected event has occurred;

retrieving audit logs that include changes associated with the industrial environment from a data repository;

determining a cause of the unexpected event and whether the unexpected event is related to an authorized change or a rogue attack; and identifying a user and the user's rights, and determining authorization to verify or edit at least one of an asset, the audit log, the industrial environment, or a portion of the industrial environment.

23. The method of claim 22, the data repository retains at least one of a hierarchical representation of assets within the industrial environment and the audit log.

24. The method of claim 23, the asset is hierarchically represented based at least in part upon a physical location of the asset within the industrial environment.

25. The method of claim 23, the hierarchical representation of assets is based at least in part upon an industry standard which can be at least one of ISA S95 and ISA S88.

26. The method of claim 22, the audit log tracks at least one of a change, an edit, a manipulation, and an update related to at least one of a process, an asset, a device, a controller, software, firmware, and a control application within the industrial environment.

27. The method of claim 22, the audit log tracks data that is authenticated by a security measure.

28. The method of claim 22, further comprising detecting at least one of when an asset has been edited, when an asset has been manipulated, when an asset has been updated, or when an asset has been changed.

29. The method of claim 28, further comprising updating at least one of the following: 1) the hierarchical representation of assets within the data repository based upon an alteration determined by the detection component; or 2) the audit log based upon an alteration determined by the detection component.

30. The method of claim 22, determining whether at least one of a rogue attack or a rogue editor is present within the industrial environment by evaluating at least the audit log.

31. A computer-implemented system stored on a storage medium that facilitates assessing unexpected field conditions based upon the verification of an audit log, comprising:

means for monitoring field conditions with respect to an industrial environment;

means for analyzing the field conditions and determining that an unexpected event has occurred and retrieves audit logs that include changes associated with the industrial environment from a data repository and determining a cause of the unexpected event and whether the unexpected event is related to an authorized change or a rogue attack; and means for identifying a user and the user's rights, and determines authorization to verify or edit at least one of an asset, the audit log, the industrial environment, or a portion of the industrial environment.

* * * * *